May 5, 1931.   P. BROWN   1,803,543
MAGNETO
Filed Dec. 19, 1929
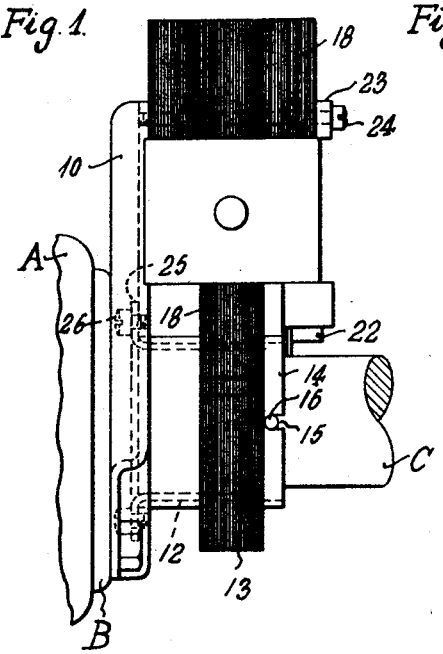
Fig. 1.
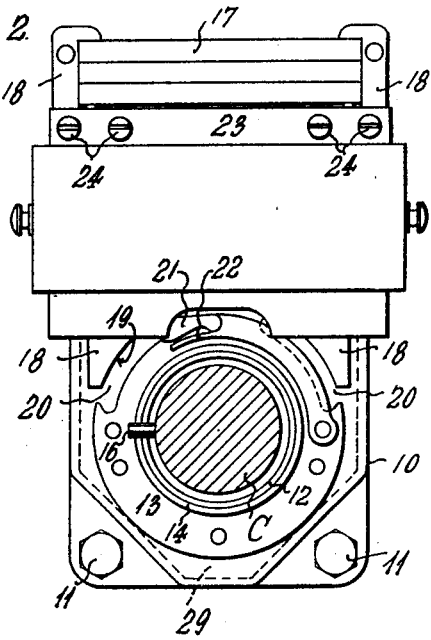
Fig. 2.
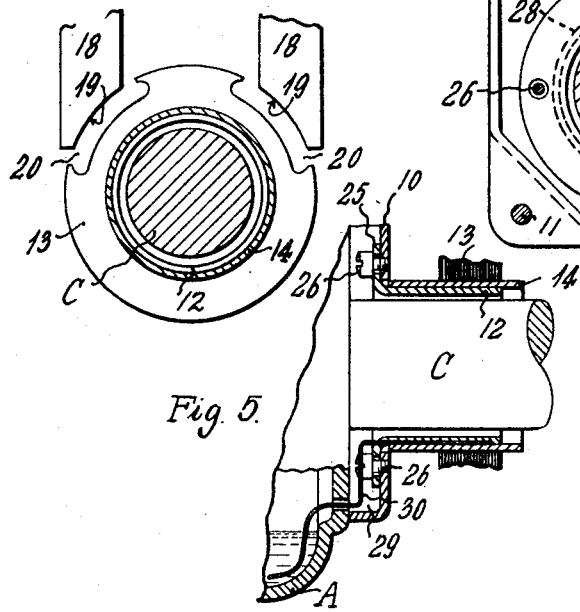
Fig. 3.
Fig. 5.
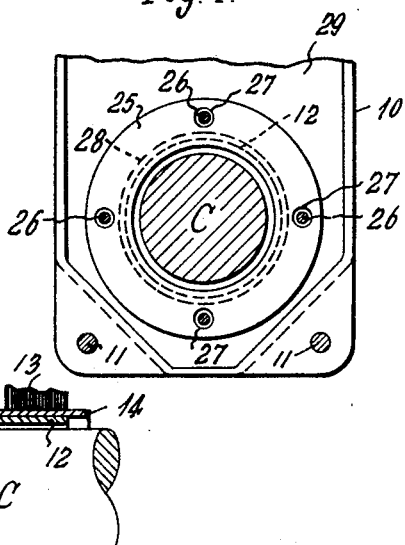
Fig. 4.
INVENTOR.
Phelps Brown
BY
Chapin & Neal
ATTORNEYS.

Patented May 5, 1931

1,803,543

UNITED STATES PATENT OFFICE

PHELPS BROWN, OF SPRINGFIELD, MASSACHUSETTS

MAGNETO

Application filed December 19, 1929. Serial No. 415,281.

This invention relates to improvements in magnetos. These improvements are especially useful in magnetos of the type having a rotary armature. More particularly, the invention has to do with the mounting of the magneto on an engine and the driving of it therefrom, as from the crankshaft thereof.

The problem for which this invention offers a solution, will best be appreciated by consideration of one specific example. Consider, for instance, the problem of providing magneto equipment for an engine of the general type shown in U. S. Letters Patent No. 1,736,441, granted November 19, 1929, on an invention of Ira E. Hendrickson. There are many and various types of magnetos, which would serve satisfactorily so far as ignition purposes are concerned, but which do not lend themselves readily to installation on engines of the above type. The conventional rotary armature magneto or any other, having as a part thereof, a rotary drive shaft adapted to be coupled end to end with an engine drive shaft, could be used but there is no convenient place available on the engine on which to mount it. Only the ends of the crankshaft are exposed and usually only the flywheel end of the shaft is available for the purpose. To use a magneto of this type on such an engine, means building out supporting brackets which are so awkward and cumbersome as to render the installation unacceptable to the engine manufacturer on the ground of appearance alone, to say nothing of the extra cost of the supporting parts as well as that of the special coupling usually necessary because of the difficulty of alining the magneto drive shaft with the engine crankshaft. Such magnetos might be belt or gear connected to the crankshaft at a point between the flywheel and the crankcase but, here again, is extra cost of parts and extra work for the engine manufacturer in order to make the installation.

Special types of magnetos have been used with engines of the above character, viz, the so-called flywheel magnetos. These are specially constructed to fit, and are built into the flywheel of the engine, the magnets revolving therewith about a stationary assembly of cores and coils. While the flywheel magneto overcomes the objection insofar as awkwardness and unattractiveness are concerned, it is relatively expensive to manufacture and has many disadvantages. The magnets, usually long ones bent into approximately circular form, are expensive because of the cost of shaping them and because of the added cost of the extra material. Also, such magnets cannot be housed in the ordinary cast iron flywheel. A flywheel of aluminum or other non-magnetic material is required for the purpose. Non-magnetic material must be used to support many other parts and much special and expensive construction is necessary. The magneto, being housed within the flywheel, is not conveniently accessible for servicing. Moreover, and this is a point involving the efficiency of the magneto, it is not feasible to use small clearances between the rotating and stationary parts of the magneto. The crankshaft may not, and often does not, run true even in a new engine and one must allow for this condition and also for the inevitable wear in the bearings which will aggravate the condition. The outer end of the crankshaft, near the flywheel, tends to whip or gyrate and this is another factor which precludes the use of small air gaps between the relatively movable parts of the magneto.

Another type of magneto, used for engines of the class described, is disclosed in the aforesaid patent. In such type, all elements of the magneto are stationary except for the rotor and this is fixed to the crankshaft at a point between the flywheel and the crankcase. Such magneto is free from the objections of the flywheel magneto. It does not have to be specially built to fit the engine and can be produced at relatively low cost as a standardized type suitable for various makes of engines. It is a simple, compact and highly efficient magneto with all the working parts, except the rotary inductor, incorporated into a single structure. The disadvantage in the patented arrangement is that the relationship of the rotary inductor with respect to the stationary pole shoe surfaces of the magneto has to be fixed in the field. The engine manufacturer must apply the inductor to his engine and then adjust the magneto unit so that the pole shoe surfaces are brought into proper relationship with the inductor. The patented arrangement is in no sense inoperative, for satisfactory operation can be had if the above described adjustments are properly made, but these require the cooperation of the engine manufacturer. The arrangement is thus open to the criticism that it leaves something for the engine manufacturer to do and something which he may do carelessly, or at any rate unsatisfactorily.

This invention is directed to an improved magneto, especially adaptable for use on engines of the above described, or equivalent character. This magneto, like magnetos of the type first above described, is a complete unit and has its own bearings to support the moving parts but, unlike such type, it is provided with means whereby it may be conveniently, simply, and satisfactorily mounted and properly driven from such an engine. The magneto of this invention overcomes all of the objections above set forth as incident to the flywheel magneto. In addition, it affords all the advantages of the magneto of the aforesaid patent, including those set forth above and also in the patent. At the same time, it overcomes the objection above set forth, to the magneto of said patent, with respect to the necessity for cooperation between the engine manufacturer and magneto manufacturer to secure satisfactory results. Only through the means of this invention can a magneto, other than of the flywheel type, be properly mounted on an engine of the aforesaid, or equivalent type, in a manner to give satisfaction to the engine manufacturer.

The present invention has for one object to provide a magneto wherein the inductor, as well as all other elements of the magneto are assembled by the magneto manufacturer on a single frame, with the parts adjusted into, and fixed in proper working relationship, so that nothing whatever is left for the engine manufacturer to do but to apply the unit to his engine and this operation has been reduced to one of a simple and substantially fool proof nature.

The invention also has for an object to provide improved means for driving the rotary inductor from the engine crankshaft in such a way as to maintain a true running inductor even though the crankshaft does not run true.

In the prior patent, the difficulties due to uneven running crankshafts was taken care of by locating both pole shoes of the magneto on the same side of the axis of revolution. Such arrangement may, if desired, be dispensed with by the use of the present invention because the inductor does not partake of any irregularities, such as eccentricity of motion of the crankshaft.

The invention will best appear as the detailed description proceeds and will be particularly pointed out in the appended claims.

The invention will be disclosed with reference to the accompanying drawings, in which:—

Fig. 1 is a side elevational view of a magneto, embodying the invention, and shows the manner in which it is installed on an engine;

Fig. 2 is a front elevational view thereof;

Fig. 3 is a fragmentary sectional view illustrative of the rotary inductor and the polar surfaces of the cores with which it cooperates;

Fig. 4 is a rear elevational view, showing the adjustable mounting on the frame of the bearing which supports the rotary inductor; and Fig. 5 is a fragmentary sectional elevational view illustrative of the means for lubricating the rotary inductor.

Referring to these drawings, A represents a portion of the crankcase or frame of an internal combustion engine, and C any shaft thereof which can be used to drive the magneto. Usually, and in this case, shaft C is the crankshaft of the engine. This shaft emerges from the housing A through a part B thereof and to this part I secure the frame 10 of the magneto, in any suitable manner as by means of cap screws 11. Frame 10 supports all the stationary elements of the magneto in the usual or any suitable manner and it is also provided with an annular bearing 12, which loosely encompasses the drive shaft C. Bearing 12 rotatably supports the rotary element 13 of the magneto and its driving element,—in this case a sleeve 14. The group of laminations, of which the element 13 is composed, is mounted on and suitably secured to sleeve 14, as for example by a drive fit. The driving member 14 may be extended beyond the outer end of bearing 12, as shown, and in its extended portion have a notch such as 15 in which a pin 16, fixed in shaft C and extending radially therefrom, is engaged. The pin serves to drive member 14 and to confine it against undue endwise movement on its bearing.

The driving connections 15, 16, between the shaft and member 14, are to be taken merely as an illustrative example of one suitable means for the purpose. They illustrate the characteristic which is essential to the present invention, namely, the transmission of turning movement from the shaft C to member 14 without transmitting any irregular movements, such as those in a radial direction caused by eccentric or wobbling motion of the shaft. Many other means, differing widely in detail from the one described, will readily occur to those skilled in the art for securing the result in essentially the same characteristic manner and I deem all of these to be within the scope of my invention. It will be readily apparent also, that the pin 16 or its equivalent, need not directly drive the member 14 but may do so indirectly through other interposed parts,—the only essential being that the wobbling or other irregular motion of shaft C is not communicated to rotary element 13.

The magneto may be of any suitable type, which requires that the rotary element move in close proximity with the polar faces, or pole shoe surfaces 19, so that for example, the so-called "rubbing" clearance exists between the relatively movable parts. An example of one suitable type is found in the aforesaid patent and the magneto, herein illustrated, may be considered as essentially the same as that disclosed in such patent. Detailed description of the magneto will not be necessary since reference may be had to the patent for a complete disclosure of its detailed construction and operation. The magnets, cores and polar faces of the magneto of the aforesaid patent are shown at 17, 18 and 19 respectively. The element 13, having notches 20, or the equivalent, is the rotary unwound inductor of said patent. The electrical elements of the magneto have not been shown herein, except for a fragment of a lever 21 (Fig. 2) which operates the movable breaker point of the interrupter mechanism. Such lever is periodically moved by a projection 22, secured to inductor 13. Having indicated how the only movable element of the electrical system may be operated, the rest of such system will be readily understood from the aforesaid patent.

The fixed elements of the magneto may be fixed to frame 10 in any suitable way. I have indicated, in part, herein one such securing means which will serve as a sufficient illustrative example. A nonmagnetic cross bar 23 extends across from one core 18 to the other and cap screws 24, which pass through this bar and the cores, thread into plate 10 and serve to hold all stationary elements thereto. As matter of practice, the securing means described is usually supplemented by other means of a similar character but they do not require consideration here, as it will suffice to state that all the stationary elements are firmly bound to frame 10 with sufficient rigidity for the desired purpose.

By preference, the bearing 12 is adjustably mounted on frame 10, as this affords a convenient way for the manufacturer to adjust the inductor 13 with reference to the pole shoe surfaces 19. This adjustment is not necessarily essential for all purposes, however, because with sufficient care in manufacture, the necessary close accuracy in the fit and close clearance between the inductor and polar faces may be secured without use of the adjustment. Such adjustment is nevertheless important as a practical matter and is preferred.

An illustrative example of one of many suitable ways of securing the adjustment is shown in the drawings. The bearing 22 has at one end a circular flange 25 which is clamped to the rear face of frame 10 by cap screws 26. As shown in Fig. 4, the holes 27, through which screws 26 pass, are sufficiently larger in diameter so that the bearing may be moved within the necessary limits both radially toward or away from the polar faces 19 and laterally with respect thereto. The hole 28 in frame 10, through which bearing 12 passes, is of course, made somewhat larger in diameter than the outside diameter of the bearing to afford freedom for the movements of adjustment of the bearing.

The frame 10 may, to advantage, be struck up out of pressed metal in a punch press in the form shown. By so doing a recessed portion 29 is afforded to receive and conceal the flange 25 and the heads of the retaining screws 26.

The matter of lubricating the rotary inductor may to advantage be taken care of in the manner shown in Fig. 5. The bearing sleeve 12 has an axially directed groove in its external peripheral surface in which is positioned a wick 30. This wick extends rearwardly to and through the flange of the bearing sleeve, thence downwardly in the recess 29 of frame 10 and through the adjacent wall of crankcase C, dipping into the oil therein, as indicated.

As pointed out in the aforesaid patent, it is essential in order to secure satisfactory and effective results, to reduce the air gap between the rotary inductor and the pole shoes 19 to a minimum. What is desired is commonly termed "rubbing clearance" by which is meant that the parts approach as closely as possible to physical contact without actually rubbing. With the necessity for such small clearance, the advantage of having a true running inductor will be readily appreciated. The invention affords just this desirable and important arrangement. The difficulties of driving the magneto from shafts, which do not run true, are entirely overcome. The magneto manufacturer no longer need even consider the matter for the shaft can wobble at will in the hole of the annular bearing 12 without imparting any of such irregular movements to the inductor 13. The adjustment of the clearance between the inductor and the polar faces 19 and the positioning of the inductor into true concentric relation with the arcuate surfaces 19 may be effected by experts at the factory, and the magneto manufacturer can thus be sure that these adjustments are properly made before the machines leaves his factory. The sole control and responsibility for properly making these adjustments is thus placed, where it belongs, in the hands of the magneto manufacturer.

The operation of the magneto, for present purposes, may be considered to be the same as set forth in the aforesaid patent. It remains to touch briefly on the installation of the magneto on the engine. The magneto is located between the flywheel and the crankcase, as shown in the aforesaid patent, and it is pointed out that here is the only place available for mounting a magneto of any type, other than the flywheel type, in a manner which will be satisfactory to the engine manufacturer. Special and awkward supporting brackets and special couplings, such as would be necessary with a magneto of the type first herein described, are avoided. So also, are the belts, gears or other driving connections and associated parts which would be necessary with such magnetos if driven indirectly from the crankshaft in an effort to secure a simple support for the magneto. The installation is simple. It is simply necessary to pull the flywheel off the crankshaft and then slip the bearing 12 thereover. The bolts 11 are then applied to hold the frame in place, after which the flywheel is replaced on the crankshaft. Thus, it will be seen that nothing is required of the engine manufacturer or of a user of an engine, except operations of the most elementary character. No special care is necessary and the work may be done without previous elaborate instructions even by those without any special skill. As distinguished from the magneto of the prior patent, the present arrangement is rendered practically foolproof, so far as installation difficulties are concerned, by incorporating all the magneto parts into a single unitary structure, whereby all adjustments may be made and the parts fixed in adjusted relationship by the magneto manufacturer before the machine leaves the factory. Also, all difficulties due to crankshafts, which do not run true, are effectually overcome by the special driving means described,—enabling a true running rotor under all conditions and thus the use of the desirable small air gaps which enhance the efficiency of the machine. Thus, the invention affords the only means by which a magneto other than of the flywheel type, can be properly mounted on and driven from an engine of the class described, in a manner to give satisfaction to the engine manufacturer, having regard to cost, appearance and simplicity of the installation, and to the ease of making it and to satisfactory operation.

The invention has been disclosed herein, in an embodiment at present preferred, for illustrative purposes, but the scope of the invention is defined by the appended claims rather than by the foregoing description.

What I claim is:

1. In a magneto, a frame adapted to be mounted on an engine and having a hollow bearing through which a shaft of the engine is adapted to pass, stationary elements for the magneto secured to said frame, and a movable inductor element mounted to turn on said bearing.

2. In a magneto, a frame for supporting the stationary elements thereof including the pole shoes from an internal combustion engine, a hollow bearing for encompassing the engine shaft by which the magneto is driven, a movable inductor element for the magneto mounted to turn on said bearing, and means securing the bearing to the frame and enabling adjustment of the inductor element with respect to said pole shoes.

3. In a magneto, a frame adapted to be mounted on an internal combustion engine and having a bearing sleeve of annular cross section for loosely encompassing the engine shaft by which the magneto is driven, stationary magnet elements including pole shoes all of which are supported by said frame, and a movable inductor element for the magneto mounted to turn on the exterior surface of said sleeve.

4. In a magneto, a frame adapted to be mounted on an internal combustion engine, a bearing sleeve of annular cross section for loosely encompassing the engine shaft by which the magneto is driven, stationary magneto elements including pole shoes all of which are supported by said frame, a movable inductor element for the magneto mounted to turn on the exterior surface of said sleeve, and means for securing said sleeve to said frame and enabling adjustment of said inductor element with respect to said shoes.

5. In a magneto, stationary and movable elements the relative movement of which causes the generation of electromotive forces, a frame for supporting said elements, a driving member for said movable element, an annular bearing for said member mounted on said frame, a drive shaft passing through the opening in said annular bearing and free to wobble or move eccentrically therein, and driving connections between said shaft and member including interengageable parts one on said shaft and one on said member, which parts are free for relative movement in a direction radially of said shaft.

6. The combination with a shaft of an internal combustion engine, of a magneto mounted on said engine and including fixed and rotary elements the relative movement of which results in the generation of electromotive forces, a frame for supporting all elements of the magneto, said frame having an annular bearing on which the rotary element of the magneto is mounted and through which said engine shaft passes with freedom for wobbling or eccentric movement, and means for driving the rotary element from said shaft so that any wobbling or eccentric movement thereof will not be imparted to the rotary element.

7. The combination with an internal combustion engine, a shaft thereof, and a receptacle for containing oil therefor; of a frame mounted on the engine and having an annular bearing loosely encompassing said shaft, said bearing having a groove in its external peripheral surface, a wick seated in said groove and extending into said receptacle and dipping into the oil therein, stationary and movable elements affording an operable magneto and all supported by said frame, a driving member for the movable element of the magneto mounted to turn on said external surface, and means for driving said member from said shaft.

8. The combination with an internal combustion engine, a shaft thereof, and a receptacle for containing oil therefor; of a frame mounted on the engine and having an annular bearing loosely encompassing said shaft, said bearing having a groove in its external peripheral surface, a wick seated in said groove and extending into said receptacle and dipping into the oil therein, stationary magneto elements and a rotary inductor therefor all supported from said frame, said inductor mounted to turn on said external surface, and means for driving it from said shaft.

9. The combination with an internal combustion engine, a shaft thereof, and a receptacle for containing oil therefor; of a magneto including a movable element mounted on the engine frame, a bearing to support said element and having a groove in its bearing surface, a wick seated in said groove and extending into said receptacle to dip into the oil therein, and means for driving said element from said shaft.

10. A magneto, having a movable inductor element, and a hollow bearing on which said element is mounted and through which the drive shaft for said element is adapted to pass.

11. In combination, a magneto having a movable inductor element, a hollow bearing on which said element is mounted, a drive shaft passing through the opening in said bearing and free to wobble or move eccentrically therein, and means for driving said element from said shaft so that any wobbling or eccentric movement thereof will not be imparted to said element.

12. In a magneto, stationary and movable elements effective on relative movement to produce a change of flux and cause the generation of an electromotive force, a frame supporting the stationary element, a stud fixed to and projecting from said frame, said movable element being journalled on said stud, an independently journalled driving member, and connecting means between said member and movable element for rotating the movable element on said stud and enabling it to turn truly about its own axis even though such axis should not exactly align with that of said driving member.

13. In a magneto, stationary and movable elements effective on relative movement to produce a change in flux and cause the generation of an electromotive force, a frame supporting the stationary element, a hollow stud fixed to and projecting from said frame, said movable element being supported by and mounted to turn on said stud and a drive shaft passing through said hollow stud.

14. In a magneto, stationary and movable elements effective on relative movement to produce a change in flux and cause the generation of an electromotive force, a frame supporting the stationary element, a hollow stud fixed to and projecting from said frame, said movable element being supported by and mounted to turn on said stud and a drive shaft passing through said hollow stud and connected to turn said movable element.

In testimony whereof I have affixed my signature.

PHELPS BROWN.